(No Model.) 2 Sheets—Sheet 1.
A. M. PARMENTER.
HEATER FOR ANIMAL DRINKING TROUGHS.
No. 387,535. Patented Aug. 7, 1888.
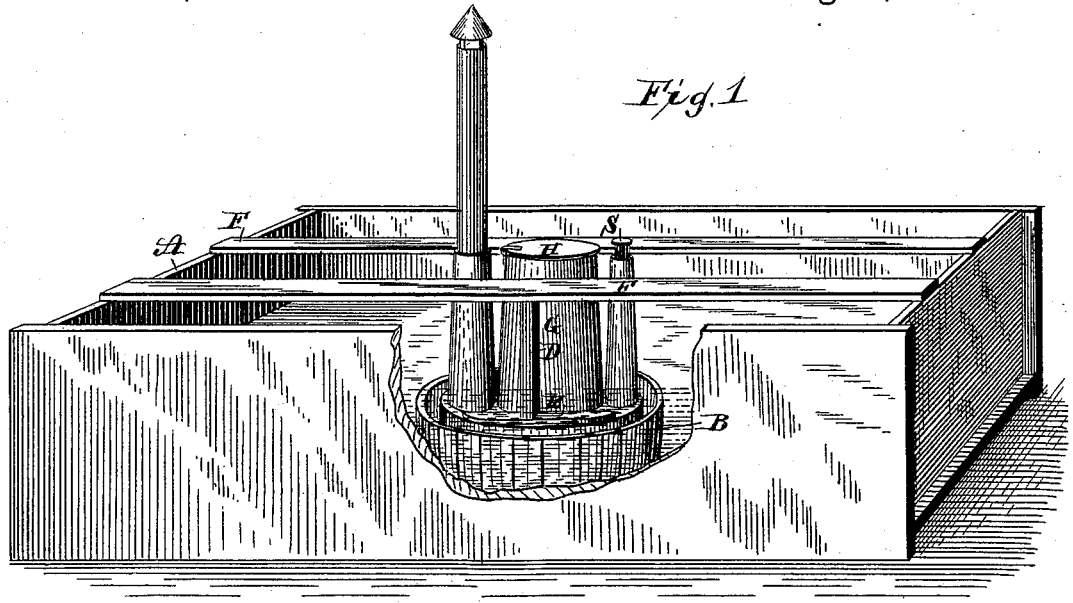
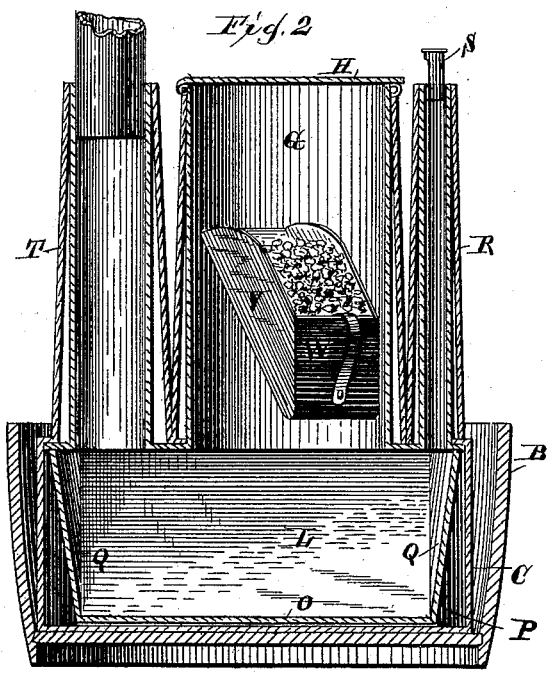
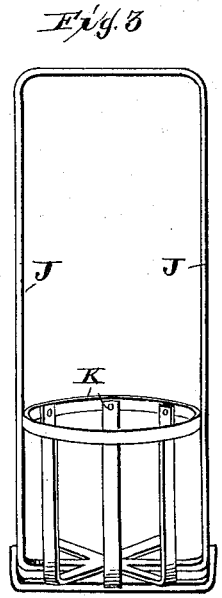
WITNESSES.
C. W. Lloyd
James H. Mahan
INVENTOR.
Allen M. Parmenter
his Attorney.

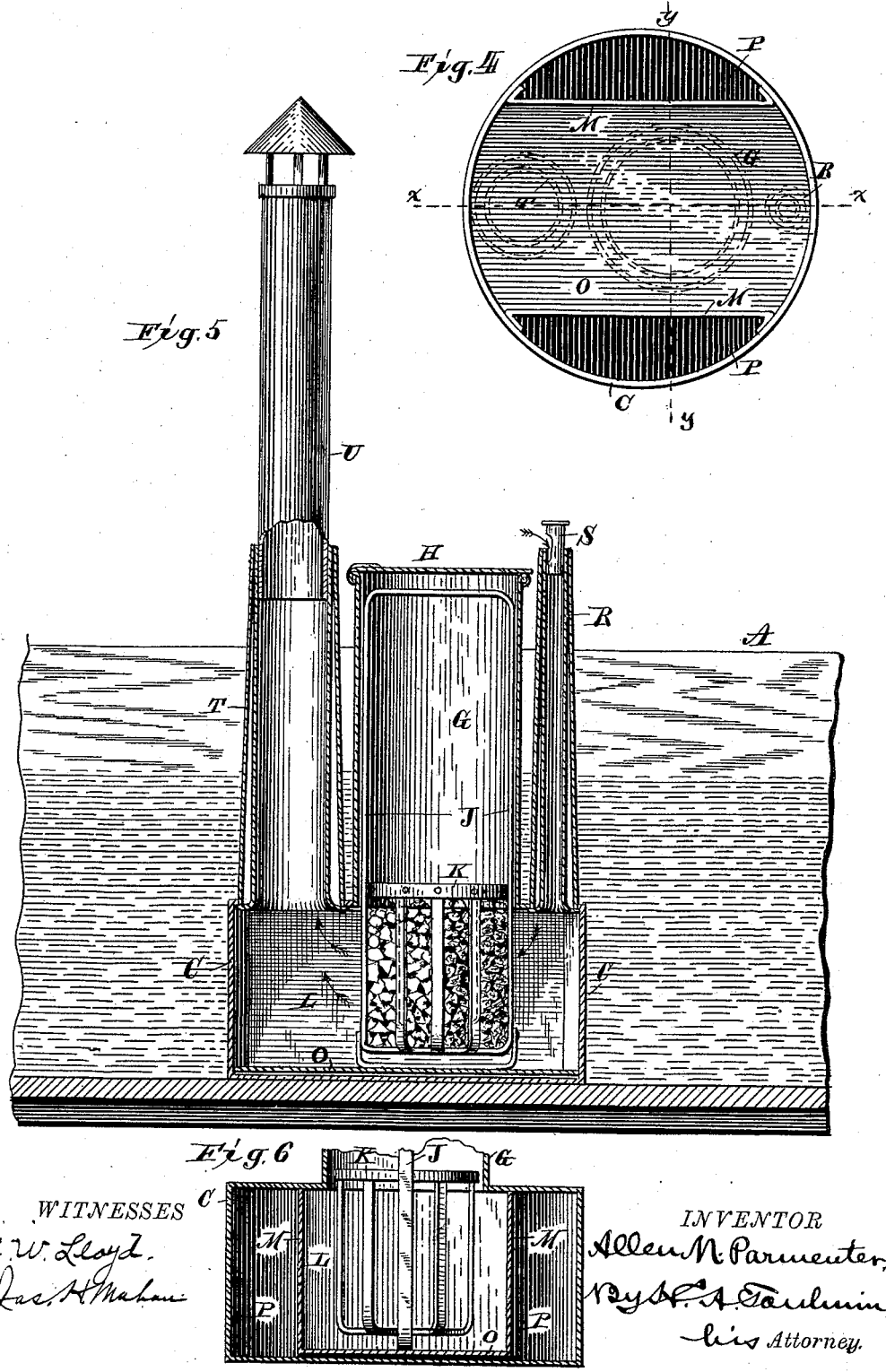

UNITED STATES PATENT OFFICE.

ALLEN M. PARMENTER, OF KNOXVILLE, ILLINOIS.

HEATER FOR ANIMAL DRINKING-TROUGHS.

SPECIFICATION forming part of Letters Patent No. 387,535, dated August 7, 1888.

Application filed February 10, 1888. Serial No. 263,638. (No model.)

*To all whom it may concern:*

Be it known that I, ALLEN M. PARMENTER, a citizen of the United States, residing at Knoxville, in the county of Knox and State of Illinois, have invented certain new and useful Improvements in Heaters for Animal Drinking-Troughs, of which the following is a specification, reference being had therein to the accompanying drawings.

This invention relates to certain new and useful improvements in heaters for use in connection with drinking-troughs for animals.

The object of the invention is to prevent the water in such troughs from freezing, whereby it is kept in condition for the animals to drink during severe weather in cold climates.

In the accompanying drawings, forming a part of this specification and on which like reference-letters indicate corresponding features, Figure 1 represents a perspective view of a water-tank of any approved construction with my improved heater placed therein; Fig. 2, a vertical sectional view of the heater and the supplemental vessel; Fig. 3, a detail perspective view of the fire-crate; Fig. 4, an inverted plan view of the heater proper; Fig. 5, a vertical sectional view of the heater complete on the line x x of Fig. 4, without the supplemental vessel and a portion of the water-tank; and Fig. 6 a detail sectional view of the heater on the line y y of Fig. 4.

The letter A designates a water-tank, such as is in general use on farms for watering cattle, the water to which is usually supplied by a windmill. In this tank is placed a tub-like vessel, B, of wood or metal, and which I term a "supplemental vessel." Within it is placed the heater. The function of the supplemental vessel is to maintain a supply of water about the heater though the water in the tank should happen to be consumed to a low level—say below the vessel B—whereby the heater is preserved against undue destruction by fire.

The letter C designates the heating-vessel, which is a circular metallic structure, sheet metal being preferred. Of course it may be of any other contour. It and the vessel B are anchored in the tank by means of posts D, resting upon strips E, placed on the vessel C, and boards F, placed across the posts and secured to the tank. This is a convenient and cheap way, though other means for this purpose may be employed. Extending upwardly from the top of the vessel C is a fuel-feeding cylinder, G, of sufficient capacity to contain fuel enough to supply the fire-crate for a period of, say, twenty-four hours. The cylinder has a cover, H. It is preferred to construct the walls of the cylinder of double thickness with an intervening dead-air space, as seen in Fig. 2, for the purpose of preventing the chilling effect of the water being transferred to the cylinder.

The letter I designates a metallic fire-crate, consisting of a bail, J, by which it is drawn out and placed in the heater, and of the bars and hoop K. This crate rests upon the bottom of the hood L, which consists of the side walls, M, and the bottom O. This hood occupies the position, as shown in Figs. 4 and 6, and incloses the fire-crate, and the smokestack and draft-pipe, and forms dead-air spaces P between its side walls and the walls of the vessel C. The purpose of these spaces is to prevent the chilling effect of the water in the tank from reaching the heating-apartment proper. By preference the hood is without ends, except as formed by the walls of the vessel C, whereby the heat within the hood is transferred through the said walls to the water in the tank. If desired, however, the hood may have ends, as seen in Fig. 2 at Q. When thus constructed, the space P will extend all around between the hood and the vessel C, and the heat radiating from the hood will pass thence through the said space and the vessel C to the water surrounding that vessel.

It is important that at least a portion of the vessel C be cut off by an intervening dead-air space from the heat-chamber proper, which is that space within the hood L, as otherwise it will either require too much fuel to maintain the vessel C in a heated condition against the cooling action of the water or that action will prevail and the matter of heating fail. Various ways will readily suggest themselves to the mechanic to secure this end, and I do not wish to be understood as limiting myself to the particular construction I have shown for this purpose.

The letter R refers to the draft or air-supply tube, which extends from the vessel C upward a suitable distance and is provided with a hollow plug, S, having a hole in the wall thereof, as shown in Fig. 1, and adjustable up and down to expose more or less of the hole above the tube and control the quantity of air admitted to the tube. Any other form of air-regulator will answer as well. The tube R is also double-walled, with a dead-air space intervening for the purpose of preventing the chilling effect of the water from reaching the air-passage and condensing the air and causing the moisture therein to lodge and freeze on the walls and eventually clog the passage. I have found what is here stated to be the fact in practice. The condensing, however, is overcome by the construction described.

The letter T refers to the lower section of the smoke-pipe, which, too, is double-walled, with an intervening dead-air space, and which extends from the chamber C to a suitable height above, and receives within it the next section, U, of the said pipe. If the passage which conveys the smoke is subject to the cooling action of the water by immediate contact therewith, the escaping products of the combustion are so chilled as to check their upward passage; and, indeed, when the fire is first started and the water very cold the effect is such that the draft is almost wholly destroyed and the fire becomes inactive and in a short time goes out. The provision of double walls cures this difficulty and maintains the proper draft. The object of fitting the section U of the pipe inside of the section T is to prevent a gummy accumulation, which more or less lodges on the inside of the pipe and which contains creosote, from reaching the outside of the section T as it slowly trickles down the inside of the pipe. If this peculiar formation reach the water, the animals refuse to drink it.

In Fig. 2 I have shown the fire-crate removed and a scoop, V, within the feeding-cylinder. This scoop is used to remove the ashes from the interior of the heater, which may be done without taking the heater from the tank if the scoop is of the proper construction. The peculiarity necessary to enable the scoop to be manipulated by reaching down into the heater is that of making the wall W at a sharp acute angle to the bottom and providing a handle which does not project beyond the length of the bottom of the scoop. Thus constructed it can be withdrawn up through the cylinder in the position shown with a load of ashes.

I have found that this heater need not be supplied with coal nor cleaned more often than once in every twenty-four hours.

Among the peculiarities of my invention are these: the presence of a dead-air space between the vessel C and the heat-chamber proper; the heating-chamber, the crate, and the feeding-cylinder leading from above the water to the crate; the air-draft tube and the smoke-pipe with the surrounding dead-air space; the removability of the crate so as to make it feasible to clean the interior of the heating-chamber in the manner described, and the supplemental vessel, surrounding the vessel C, to prevent the water from getting below the proper level with respect to said vessel C.

Having thus fully described my invention, what I claim as new, and desire to secure by Letters Patent, is—

1. The combination, with a vessel composing the body of a heater, and a heating-chamber within it, with a dead-air space between the vessel and chamber, and having a suitable fire-crate within said chamber, of a draft-tube leading into said chamber, a smoke-pipe leading from said chamber, and a fuel-feeding cylinder also leading into said chamber.

2. The combination, with a vessel composing the body of the heater, a fuel-feeding cylinder, a draft-tube, and a smoke-stack leading upward therefrom, of a hood composed of two side walls and a bottom fitted within said vessel and inclosing the lower ends of said tube, pipe, and cylinder, and a removable fire-crate located within said hood.

3. The combination, with the vessel composing the body of the heater, of a hood fitted therein constituting in its interior a heating-chamber and forming between its exterior and the said vessel one or more dead-air spaces, and a suitable fire-crate within said chamber.

4. The combination, with a vessel composing the body of the heater and a fuel-feeding cylinder mounted upon and discharging into it, of a heating-chamber within the vessel, with a dead-air space between it and the vessel and a removable fire-crate within said chamber and beneath said cylinder.

5. In a heater for animal drinking-troughs, the following instrumentalities: a metallic vessel composing the heater proper, a heating-chamber within said vessel with a dead-air space between the vessel and chamber, a fire-crate removably fitted within said chamber, a double-walled feeding-cylinder extending upward from the vessel and opening into said chamber, a double-walled draft-tube, and a double-walled smoke-pipe also extending upward from the vessel and opening into said chamber, an auxiliary vessel within which the heater proper is placed, with a space between them for the purpose of holding a supply of water about the vessel to protect the same against injury from the fire, and suitable posts and strips engaging with the vessel and adapted to be fastened to a water-trough, for the purpose set forth.

In testimony whereof I affix my signature in presence of two witnesses.

A. M. PARMENTER.

Witnesses:
 WILBER COLVIN,
 JAMES H. MAHAN.